(12) United States Patent
Gulati et al.

(10) Patent No.: US 11,501,378 B2
(45) Date of Patent: Nov. 15, 2022

(54) METHODS AND SYSTEMS OF A PATIENT INSURANCE SOLUTION AS A SERVICE FOR GIG EMPLOYEES

(71) Applicants: Vineet Gulati, Fremont, CA (US);
Pritim Prasad, San Ramon, CA (US);
Divyesh Motiwalla, San Jose, CA (US)

(72) Inventors: Vineet Gulati, Fremont, CA (US);
Pritim Prasad, San Ramon, CA (US);
Divyesh Motiwalla, San Jose, CA (US)

( * ) Notice: Subject to any disclaimer, the term of this patent is extended or adjusted under 35 U.S.C. 154(b) by 0 days.

(21) Appl. No.: 16/679,142

(22) Filed: Nov. 8, 2019

(65) Prior Publication Data

US 2020/0226690 A1 Jul. 16, 2020

Related U.S. Application Data

(60) Provisional application No. 62/757,296, filed on Nov. 8, 2018.

(51) Int. Cl.
*G06Q 40/08* (2012.01)
*G06N 20/00* (2019.01)
*G06Q 40/02* (2012.01)

(52) U.S. Cl.
CPC .............. *G06Q 40/08* (2013.01); *G06N 20/00* (2019.01); *G06Q 40/02* (2013.01)

(58) Field of Classification Search
None
See application file for complete search history.

(56) References Cited

U.S. PATENT DOCUMENTS

| 2005/0182660 | A1* | 8/2005 | Henley | G06Q 40/08 705/37 |
| 2019/0080416 | A1* | 3/2019 | Smith | G06N 20/00 |
| 2019/0385126 | A1* | 12/2019 | Morrow | G06N 20/00 |
| 2021/0065132 | A1* | 3/2021 | Yang | G06Q 20/202 |

OTHER PUBLICATIONS

Stacy Mendenhall, Coming in 2020: The "Smart HSA," Powered by Artificial Intelligence, Jul. 16, 2019, entire document pertinent, retrieved from https://www.tri-ad.com/blog/coming-in-2020-the-smart-hsa-powered-by-artificial-intelligence/ (Year: 2019).*

K. N. Ramamurthy et al., "A configurable, big data system for on-demand healthcare cost prediction," 2017 IEEE International Conference on Big Data (Big Data), 2017, pp. 1524-1533, doi: 10.1109/BigData.2017.8258086. (Year: 2017).*

* cited by examiner

*Primary Examiner* — Gregory S Cunningham, II

(57) ABSTRACT

In one aspect, a method for managing a patient-provider relationship, includes the step of providing a tiered structure for patient specific financial support. The method includes the step of providing a tailored patient financial workflows for pre-care financial commitment, approvals and post-care claims adjudication. The method includes the step of providing a multiple financial support options ranging from one off patient payment commitments, revolving options for multiple commitments or a fixed monthly amount determined by the patient. The method includes the step of providing a unified master servicing agreement that coordinates and manages the patient support experience and integrates the often-disparate servicing aims for payers, providers, credit underwriters.

3 Claims, 12 Drawing Sheets

METHODS AND SYSTEMS OF A PATIENT INSURANCE SOLUTION AS A SERVICE FOR GIG EMPLOYEES

CLAIM OF PRIORITY

This application claims priority to and incorporates by reference U.S. Provisional Application No. 62/757,296, titled METHODS AND SYSTEMS OF A PATIENT INSURANCE SOLUTION AS A SERVICE, and filed on 8 Nov. 2018.

BACKGROUND

Payssurance provides employees with an employer supported benefit to help manage their health expenses and avoid the undue financial strain from increasing cost share. Employees track costs in real-time, understand existing financial resources, and use the integrated 'healthfund advance' to pay providers.

A recent study found that 44% of patients faced a hard choice between delaying medical care and incurring long-term debt to cover anticipated care. (See The Commonwealth Fund, The Problem of Underinsurance and How Rising Deductibles Will Make It Worse, May 2015.) The study found that a large percentage of these patients had to either significantly cut other personal expenses or dip into their long-term savings to cover their medical expenses. Utilizing either option severely stressed the patient's financial well-being.

Employers continue to face the increasing burden of providing healthcare to employees and their families. Employers continue to optimize enrollment strategies, benefit designs, cost share to employees but are unable to make a dent in their cost structure. Currently, 19% of payroll costs are attributable to benefits which is up by 55% from 2007.

Employer's approach to changing the enrollment mix to high deductible plans is challenged as employee adoption of these plans is reached static levels of estimated 30%. Employees continue to show a reluctance to adopt high deductible plans given their continuing concerns about exposure to high deductibles and perception of healthcare access being limited in these plans.

Employers utilize Payssurance to gain deeper insights into total employee financial health, develop health benefit designs to improve employee financial well-being and apply greater rigor in contributing to employees.

Payssurance has a network of financing options that can be brought to bear with or without subsidy by the plan sponsor. Our proprietary software uses both population-based, individual financial and other data sets to group populations into cohorts and serve up for each employee/patient their most advantageous set of payment options.

Most healthcare providers find themselves in a perpetual margin squeeze between rising costs and flat or shrinking reimbursements. These increasing financial pressures result from an increasing share of patients covered by high deductible plans, from lower commercial reimbursements on "narrow-network" products and the state health benefit exchanges, from baby boomers leaving the commercial population and entering Medicare, and from lower Medicaid and Medicare reimbursements from budget constrained state and federal governments. In this tough environment, most not-for-profit healthcare providers spend at least five percent (5%) of their total revenue on a combination of charity care, revenue cycle activities, and bad debt write-offs. This percentage is often much higher for healthcare providers in states with limited or no Medicaid expansion. With increased public healthcare financing through various subsidies and outlays and the accompanying regulatory scrutiny that comes with increased government financial oversight, healthcare providers are being required to implement internal control and audit systems to report revenue, charity and bad debt amounts in a more holistic way (both their pre- and post-care activities). A major component of this holistic approach is an in-depth understanding of each patient's financial capacity assessed as early in the payment cycle process as possible. Providers generally obtain prior authorization from insurers before care is rendered. However, without a comprehensive financial view of each patient, healthcare providers find it difficult to ascertain the patient's true ability to pay the anticipated balance that will be due after claims adjudication. Lacking this insight, health systems have a difficult time managing their overall revenue cycle, focusing collection efforts on those who really should pay their patient balances, identifying charity care targets, and determining appropriate accounts to write-off as bad debt. A recent study found that 44% of patients faced a hard choice between delaying medical care and incurring long-term debt to cover anticipated care. The study found that a large percentage of these patients had to either significantly cut other personal expenses or dip into their long-term savings to cover their medical expenses. Utilizing either option severely stressed the patient's financial well-being.

BRIEF SUMMARY OF THE INVENTION

In one aspect, a method for managing a patient-provider relationship, includes the step of providing a tiered structure for patient specific financial support. The method includes the step of providing a tailored patient financial workflows for pre-care financial commitment, approvals and post-care claims adjudication. The method includes the step of providing a multiple financial support options ranging from one off patient payment commitments, revolving options for multiple commitments or a fixed monthly amount determined by the patient. The method includes the step of providing a unified master servicing agreement that coordinates and manages the patient support experience and integrates the often-disparate servicing aims for payers, providers, credit underwriters.

In another aspect, a computer-implemented method of training a machine-learning based prediction engine for patient insurance solution as a service for gig employees. The method includes the step of collecting a data set of Unique Personas for predicting enrollment in high-deductible health plan (HDHP) and a Health savings account (HSA). The method includes the step of collecting a dataset of an on-demand fund analysis comprising a set of wage and value-based predictors of on-demand funds needed for care. The method includes the step of cleaning the data set of Unique Personas and the dataset of an on-demand fund analysis. The method includes the step of creating a first training set comprising the collected set of the data set of Unique Personas. The method includes the step of creating a second training set comprising the and the dataset of an on-demand fund analysis. The method includes the step of training the machine-learning based prediction engine in a first stage using the first training set and the second training set.

Figure 1:
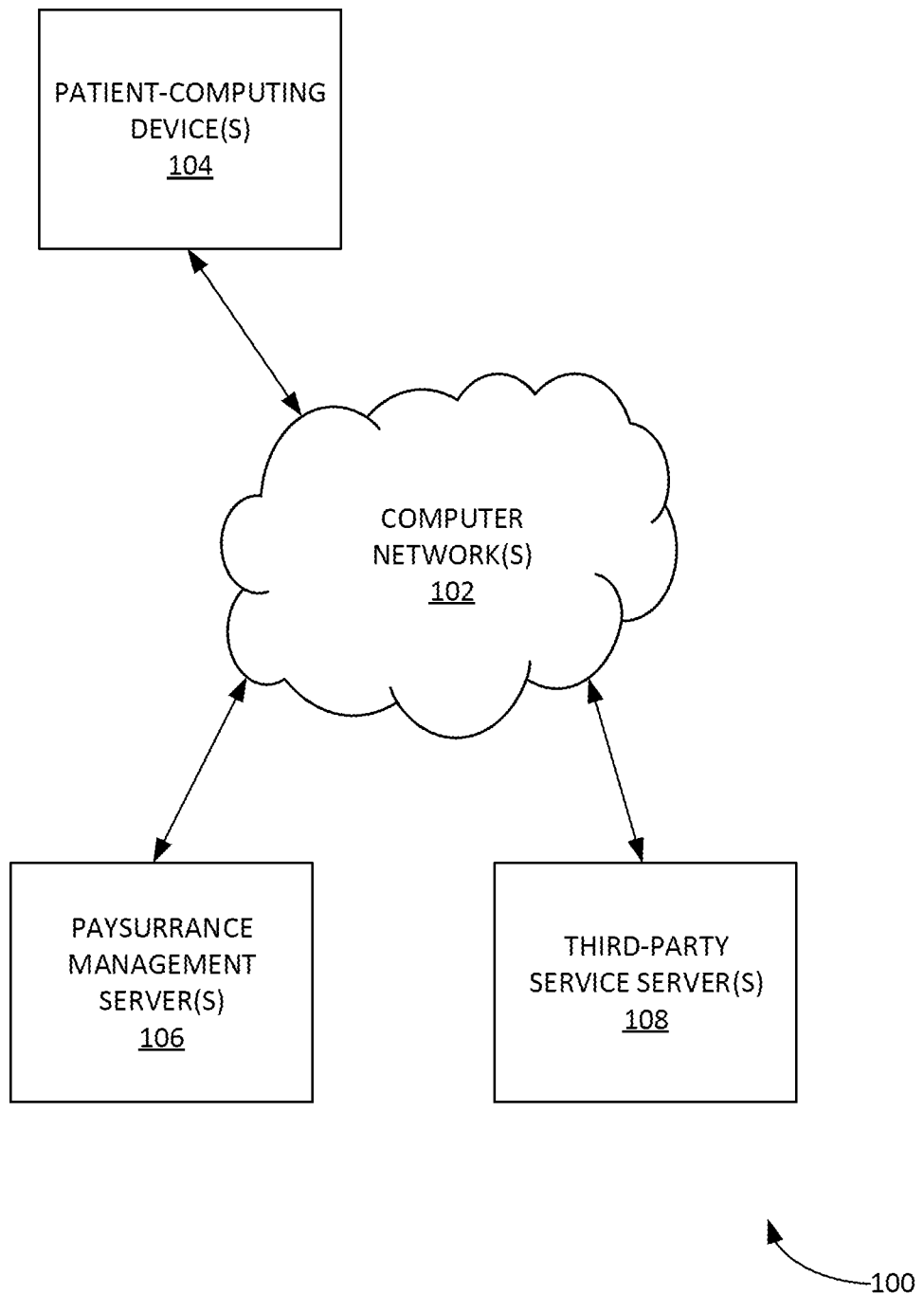
FIG. 1 illustrates an example system for patient insurance solution as a service management, according to some embodiments.

The Figures described above are a representative set and are not an exhaustive with respect to embodying the invention.

DESCRIPTION

Disclosed are a system, method, and article of manufacture for patient insurance solution as a service for gig employees. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application can be a computer program designed to perform a group of coordinated functions, tasks and/or activities for the benefit of the user.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Health savings account (HSA) is a tax-advantaged medical savings account available to taxpayers in the United States who are enrolled in a high-deductible health plan (HDHP).

High-deductible health plan (HDHP) is a health insurance plan with lower premiums and higher deductibles than a traditional health plan.

Machine learning is a type of artificial intelligence (AI) that provides computers with the ability to learn without being explicitly programmed. Machine learning focuses on the development of computer programs that can teach themselves to grow and change when exposed to new data.

Recommendation system can be a subclass of information filtering system that seeks to predict the 'rating' or 'preference' that a user would give to an item.

Example Embodiments

The Payssurance 'healthfund' is a digital financial account for employees/patients to plan and pay for unplanned healthcare expenses in the face of rising deductibles. The solution brings together the key stakeholders in the healthcare payment ecosystem and reduces the friction for healthcare payments between employees, employers, providers and lenders. The ecosystem reduces the risk of non-payment for creditors, burden on employees for deductibles and gives the assurance of payment to providers. Employees can track healthcare expenses, plan for anticipated expenses, understand existing financial resources, and access the 'healthfund' account to satisfy their healthcare payment obligation. The healthfund provides employees with an additional savings and credit account integrated into employees' payroll and employer's human resources systems. Employees are able to set contribution levels based on healthcare deductibles, income and anticipated spend. Payssurance will also suggest contribution levels based on individual predictive models of spend, income and credit need for employees.

The 'healthfund' provides the employee with an available advance amount during enrollment and updates the employees credit status during the plan year. The savings and credit account work seamlessly with the employee's other financial resources (bank accounts, credit cards, Health Savings Accounts).

The Payssurance solution will conduct a population assessment which will segment employees based on their demographic, social, health and financial status to predict their financial need and total borrowing capacity. The solution provides the employers with the tools and processes to apply contribution levels for financial support with greater rigor and adapted to individual employee needs and financial resources.

Payssurance is integrated into the annual enrollment, benefit selection and benefit administration solutions used by employers and employees. Employees engage with Payssurance during annual enrollment and are able to identify the available savings and credit available as part of their high deductible plan benefits and cost share. Once the employee health insurance is accessible at the start of the plan year, employees can connect their insurance and financial accounts, review their expenses, understand and estimate costs, and pay providers. Payssurance will notify employees of their healthfund status, financial resources and costs and alert them to opportunities to build long term health savings.

A patient insurance solution as a service provided. The patient insurance solution as a service can simplify and enhance the experience for a patient in an insurance context while maintaining the integrity of the patient-provider relationship to access high quality affordable healthcare. Providers can retain their social/brand mission, community support and endeavors to act as an extension of the provider in improving the financial lives of patients. The patient insurance solution as a service is a transparent patient-centric solution wherein the patient has visibility into their financial obligations, status and commitments. The patient can control the decision to obtain financial support with insightful education and recommendations from the patient insurance solution as a service. These can be based on the patient's financial needs. The patient insurance solution as a service can ensure that patients have financial support required during the continuum of care that matches their demographic, social, financial and healthcare needs. The patient insurance solution as a service integrates into the provider-payer revenue cycle capabilities to administratively identify efficiencies that can further reduce the cost burden for the patient.

The patient insurance solution as a service can ensure the continued integrity of the patient-provider relationship, by implementing the following principles. The patient insurance solution as a service can provide a tiered structure for patient specific financial support. The patient insurance solution as a service can provide a tailored patient financial workflows for pre-care financial commitment, approvals and post-care claims adjudication. The patient insurance solution as a service can provide a multiple financial support options ranging from one off patient payment commitments, revolving options for multiple commitments or a fixed monthly amount determined by the patient. The patient insurance solution as a service can provide a unified master servicing agreement that coordinates and manages the patient support experience and integrates the often-disparate servicing aims for payers, providers, credit underwriters.

Example Computer Architecture and Systems

FIG. 1 illustrates an example system 100 for patient insurance solution as a service management, according to some embodiments. System 100 can include various computer and/or cellular data networks 100. Networks 102 can include the Internet, text messaging networks (e.g. short messaging service (SMS) networks, multimedia messaging service (MMS) networks, proprietary messaging networks, instant messaging service networks, email systems, etc. Networks 102 can be used to communicate messages and/or other information from the various entities of system 100.

Patient-computing devices 104 can be any computing device used by a user to access information provided by application management server(s) 106. For example, patient-computing devices 104 can include a web browser, mobile-device application and the like. These can be used to perform the client-side steps of the processes provided infra.

Payssurance management server(s) 106 can implement the various process provided herein (e.g. processes 400-900, processes in Appendix A, etc.). Paysurrance management server(s) 106 can aggregate data from various sources such as, inter alia: patient financial statements, employment information, medical expenses, insurance data, etc. and applies machine learning algorithms, artificial intelligence functions and other analytics to this data.

Paysurrance management server(s) 106 can include various machine learning functionalities that can analyze patient behavior, finances, insurance options, patient segmentation and the like. Example machine-learning algorithms can include, inter alia: clustering, classification, RFM (Recency, Frequency and Monetary) analysis. Patient The approach works on collaboratively implementing the following capabilities and continuous monitoring of results to improve the provider's financial outcomes and payer's member cost burdens. Paysurrance management server(s) 106 can segments patients based on their demographic, social, health and financial status to predict their likely financial need. Via the paysurrance management server(s) 106 healthcare providers can offer patients personalized financial options ranging from point of care payments, lending and other credit solutions without financial recourse to the healthcare provider as needed.

Paysurrance management server(s) 106 can include recommendation systems that can provide a set of ranked recommendations to patience based on the output of the machine learning functionalities, patient segmentation, etc. Paysurrance management server(s) 106 can access third-party services server(s) 108 (e.g. healthcare provider servers, insurance company servers, medical care provider servers, etc.) to obtain additional information as needed.

Figure 2:
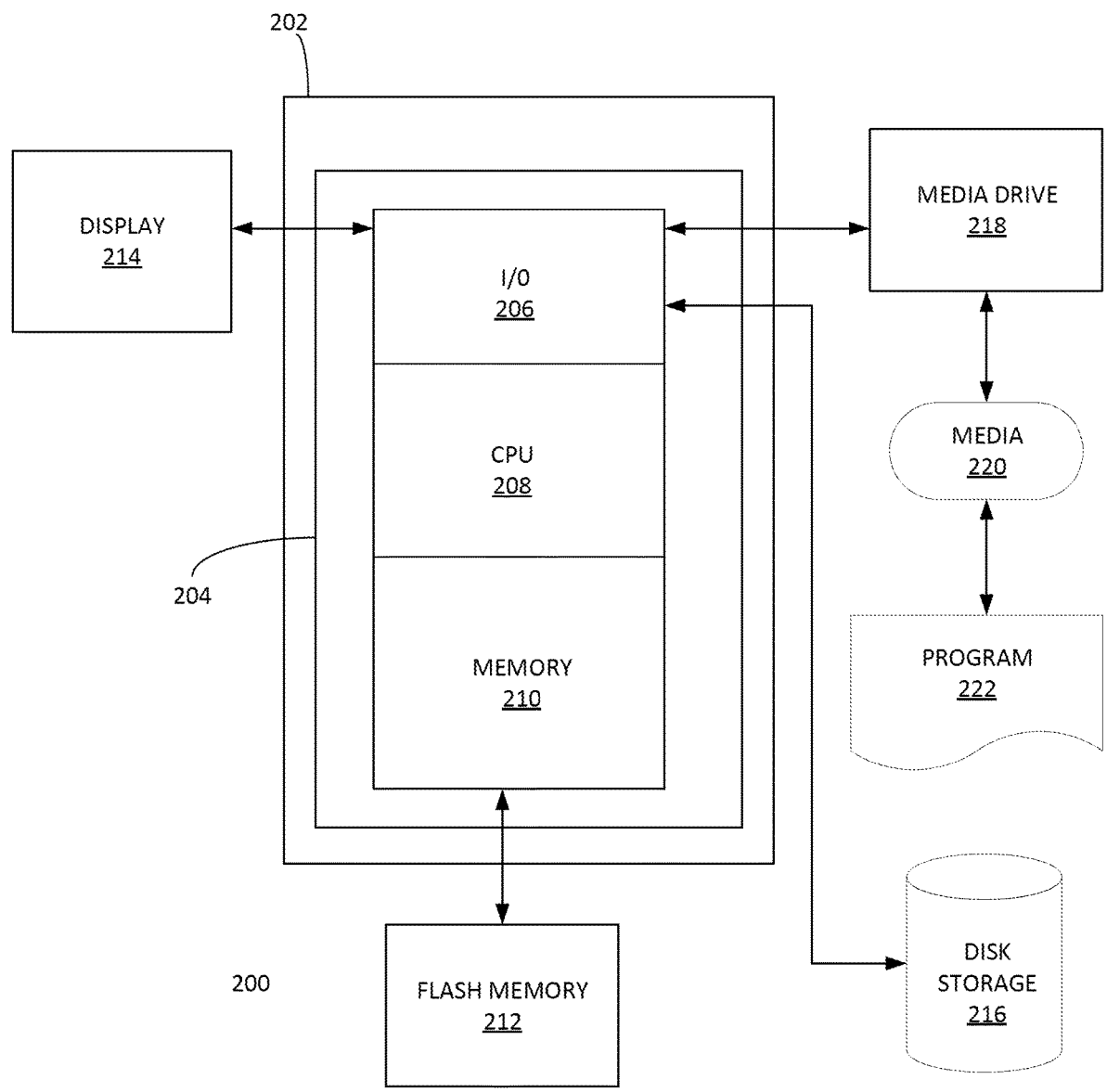
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
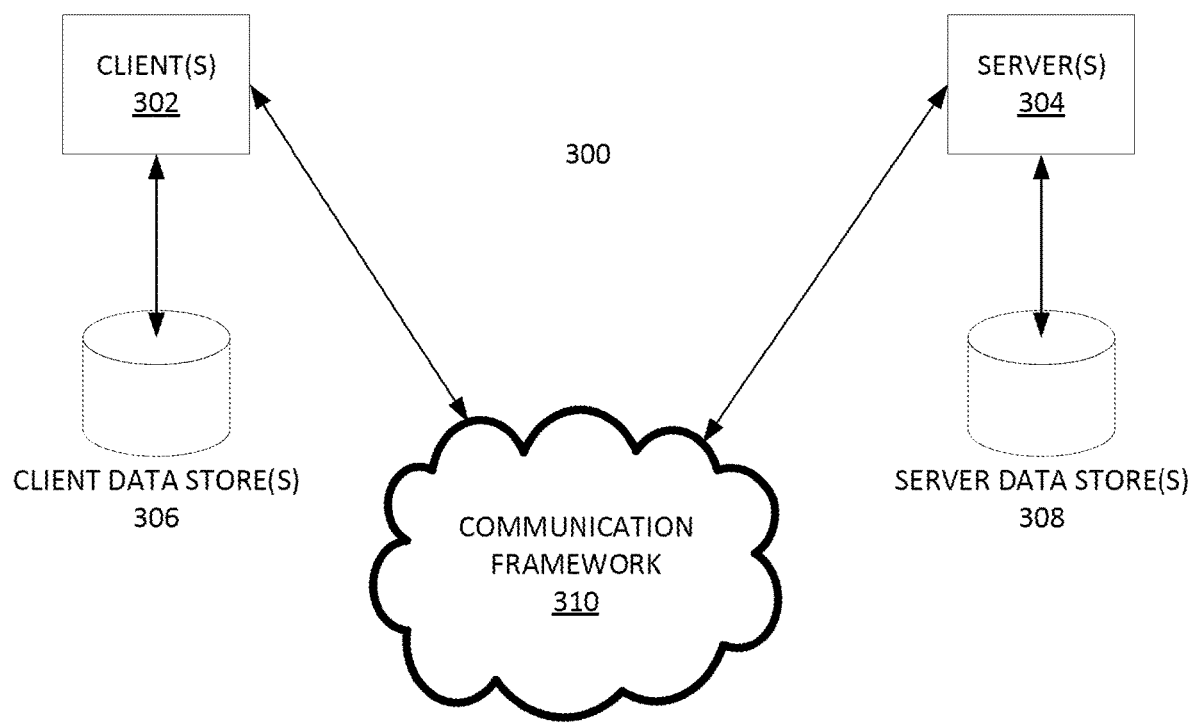
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
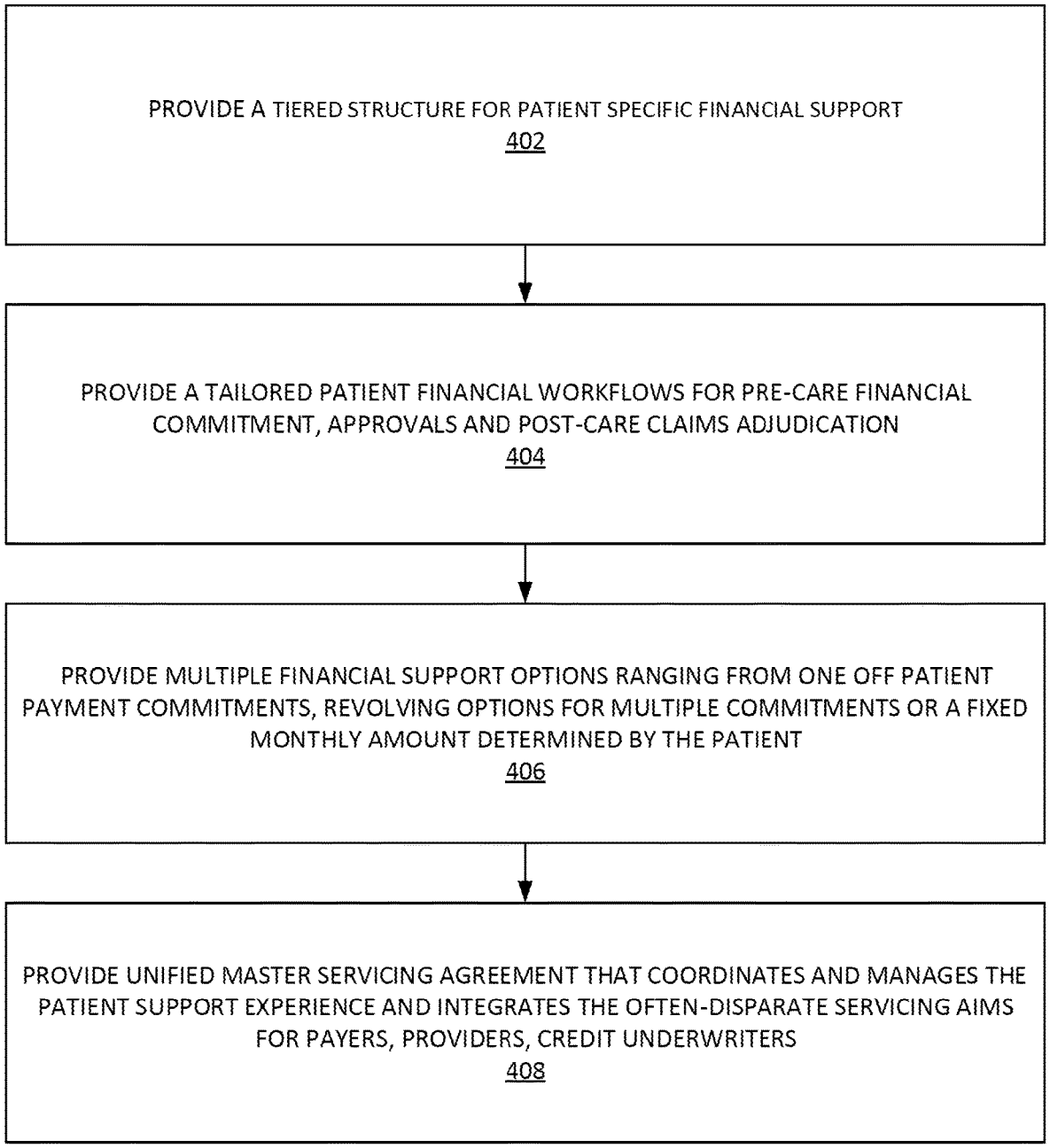
FIG. 4 illustrates an example process for managing a patient-provider relationship, according to some embodiments.

FIG. 4 illustrates an example process 400 for managing a patient-provider relationship, according to some embodiments. In step 402, process 400 can provide a tiered structure for patient specific financial support. In step 404, process 400 can provide a tailored patient financial workflows for pre-care financial commitment, approvals and post-care claims adjudication. In step 406, process 406 can provide a multiple financial support options ranging from one off patient payment commitments, revolving options for multiple commitments or a fixed monthly amount determined by the patient. In step 408, process 400 can provide a unified master servicing agreement that coordinates and manages the patient support experience and integrates the often-disparate servicing aims for payers, providers, credit underwriters.

Figure 5:
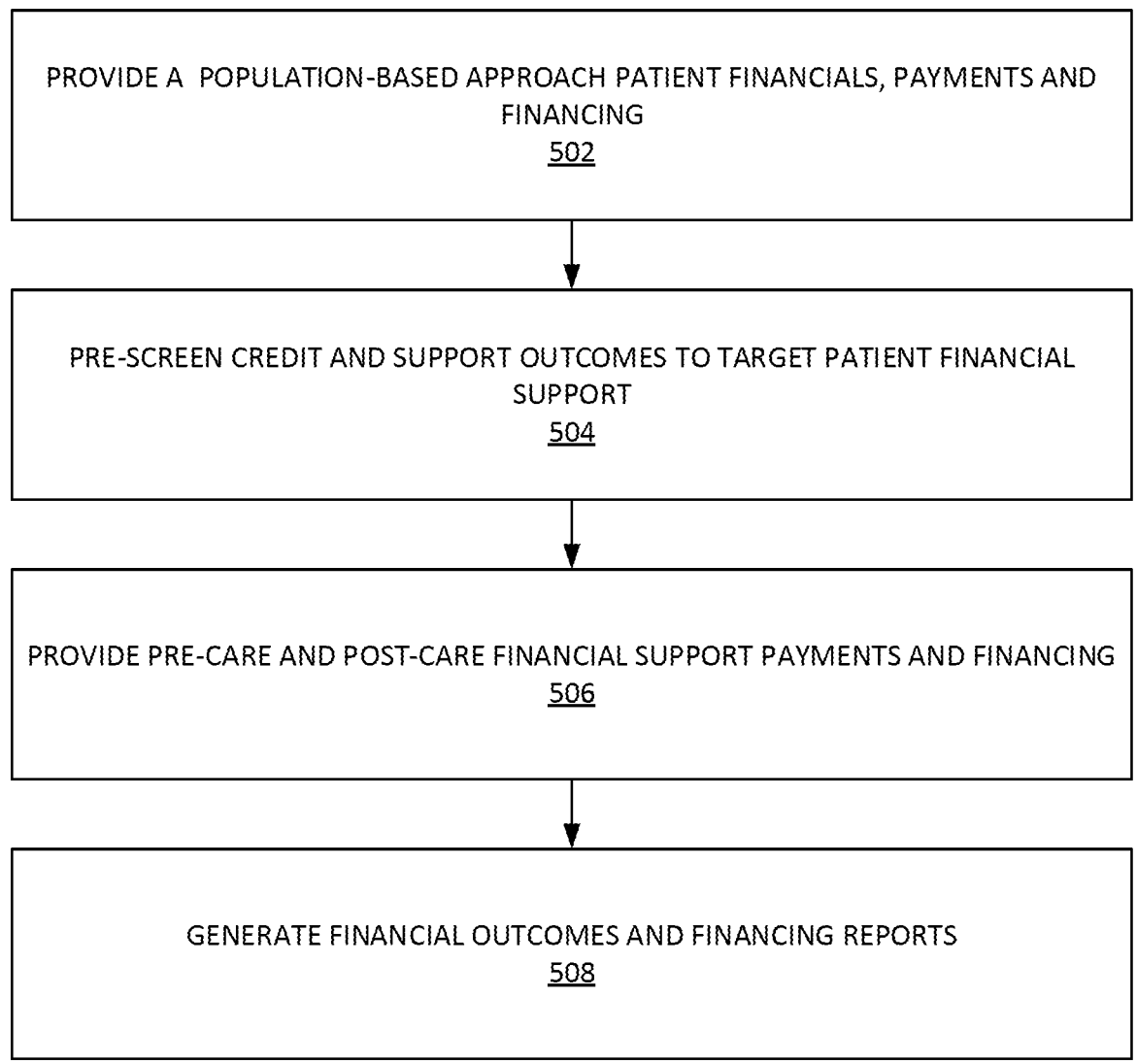
FIG. 5 illustrates an example process for providing a patient-specific financial support as a service, according to some embodiments.

FIG. 5 illustrates an example process 500 for providing a patient-specific financial support as a service, according to some embodiments. In step 502, process 500 can provide a population-based approach patient financials, payments and financing. Step 502 can include a review of a patient portfolio and a determination of a segment-based patient financial support and shared cost arrangement. Step 502 can mitigate risk of high interest charges and eliminate aggressive patient financing approaches by lenders.

In step 504, process 500 can pre-screen credit and support outcomes to target patient financial support. Patient de-identified inputs can be used to continuously test and approve financial support outcomes. Patient approval and denial cases can be identified earlier to avoid negative patient financial outcomes. Step 504 can include determining optimal financial support options and adjustment needs identified and include dedicated underwriting partners.

In step 506, process 500 can provide pre-care and post-care financial support payments and financing. Step 506 can identify and communicate patient's presumptive eligibility for financial support. In step 506, process 500 can manage patient needs from approval, repayment and reviews. Step 506 can include a unified patient servicing to avoid aggressive collections on default.

In step 508, process 500 can generate financial outcomes and financing reports. Step 508 can include use of reporting and/or insights into patient financial support approvals, adjustments and history. Step 508 can use a patient debt-to-income insights to improve future payment and revenue recovery. Step 508 can provide health systems with detailed community benefit reporting.

Figure 6:
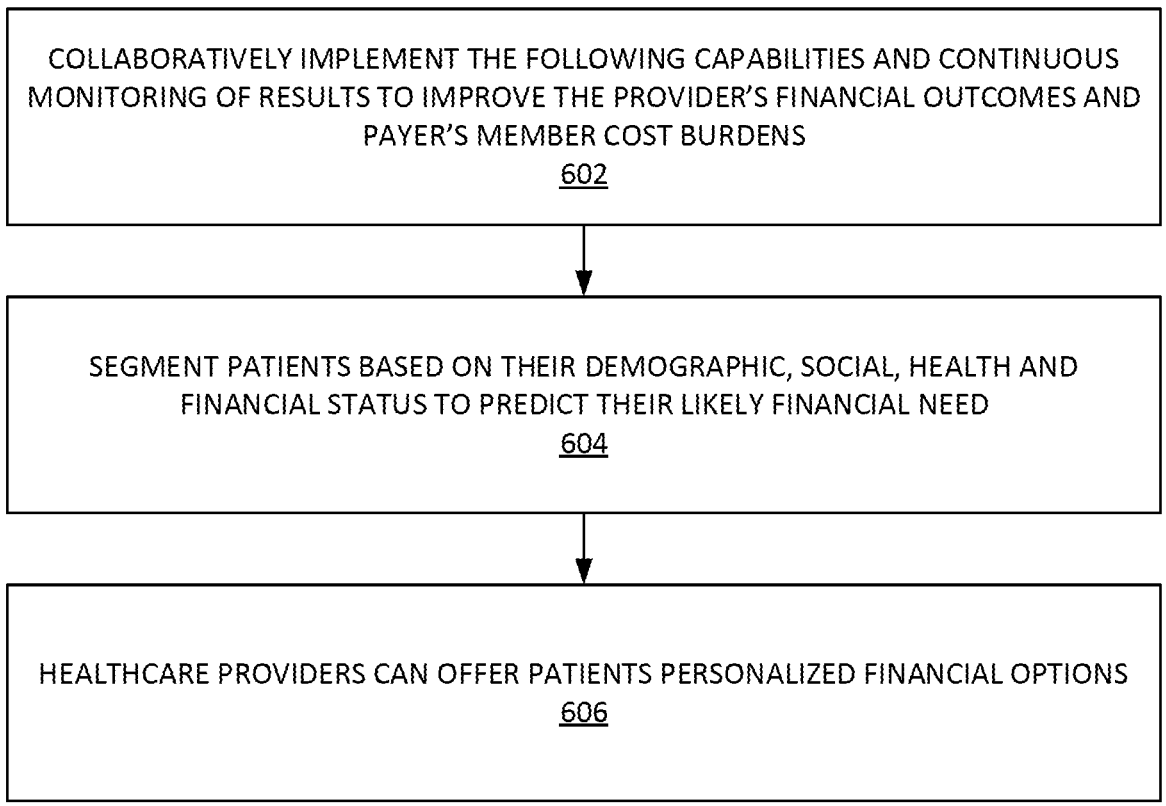
FIG. 6 illustrates another example process for providing a patient-specific financial support as a service, according to some embodiments.

FIG. 6 illustrates another example process 600 for providing a patient-specific financial support as a service, according to some embodiments. In step 602, process 600 can collaboratively implement the following capabilities and continuous monitoring of results to improve the provider's financial outcomes and payer's member cost burdens. In step 604, process 600 can segment patients based on their demographic, social, health and financial status to predict their likely financial need. In step 606, healthcare providers can offer patients personalized financial options. These options can range from point of care payments, lending and other credit solutions, etc. The personalized financial options can be without financial recourse to the healthcare provider as needed. In this way, healthcare providers benefit from collecting accounts that previously might be written off as bad debt, while being able to better manage their community and charitable care commitments both of which are essential for licensing, receiving financial support and maintaining their tax-exempt, not-for-profit status.

Figure 7:
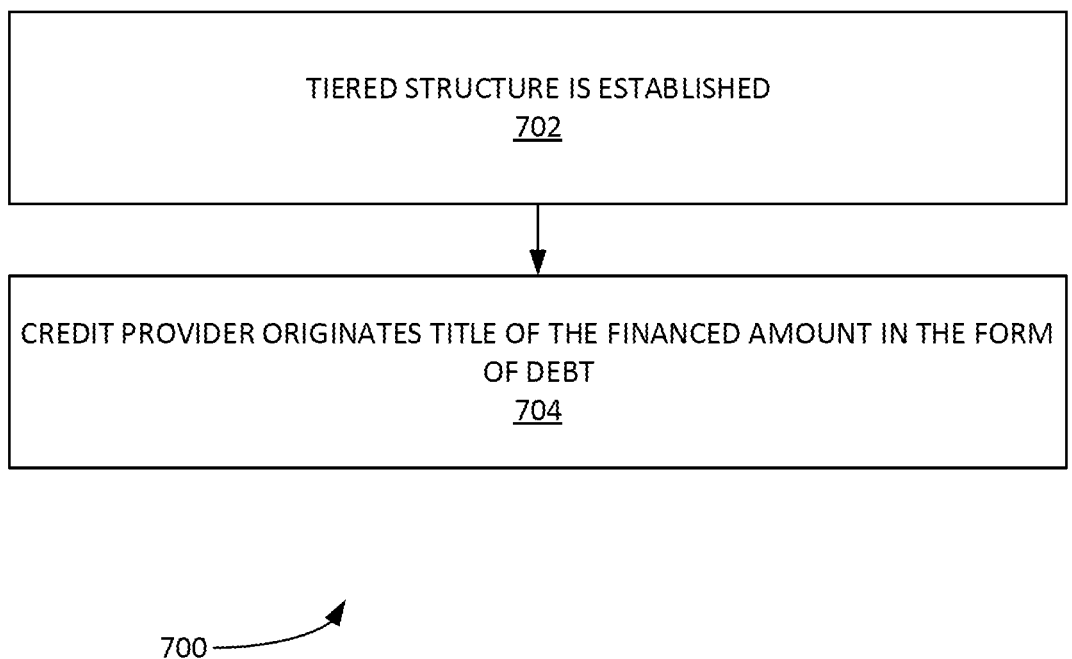
FIG. 7 illustrates a process for managing a tiered structure for financial support in a patient insurance solution as a service, according to some embodiments.

FIG. 7 illustrates a process for managing a tiered structure for financial support in a patient insurance solution as a service, according to some embodiments. The tiered structure for financial support can be established closely with input and active collaboration with a provider, payers (e.g. as needed) to ensure that the solution is able to provide active financial support to patients. The emphasis is on laying the groundwork for education, guidance for long term benefits to the patient arising from:

improvements in overall patient financial condition leading to better health outcomes; and efficiencies in revenue cycle that can be implemented using the patient insights and administrative solutions provided by the patient insurance solution as a service.

In step 702, the tiered structure is established. The tiered structure can be established using the following criteria based on actual criteria as decided and agreed upon with the provider and payer. In one example, the following criteria can be utilized:

patients with defined income, credit risk (e.g. FICO score>650) and other socio-demographic factors;

patient decides on the use of the patient insurance solution as a service to obtain financing for the patient's payment responsibilities; and patient will be able to utilize funds to pay provider and retain control of repayments for financed amount.

In step 704, the credit provider (e.g. Payssurance©, other patient insurance solution as a service provider, etc.) can originate title of the financed amount in the form of debt. In one example, the payment to provider can be on a non-recourse basis or other terms as mutually agreed upon with provider. The following factors can be included in step 704, inter alia:

terms of the 'Unified Master Servicing Agreement' can apply as to rules relating to nonpayment, disclosure, follow-up and including other terms as documented in the agreed document;

patients below defined income, credit risk (e.g. <650) and other socio-demographic factors;

patients that illustrate a constrained financial capability during screening and population assessment receive patient financial support;

the patient financial repayment and support obligations can be decided by the provider and conform to existing and approved payment plans supported by provider. (In one example, the title of the receivable (debt) does not transfer to patient insurance solution as a service provider);

patient can select the term of repayment from a number of pre-determined options agreed upon in advance with provider;

the patient insurance solution as a service provider can assume the financing obligations and could securitize the underlying repayment cash flow from providing financial support to the patient;

the patient insurance solution as a service provider can agree to assume financial repayment obligations and perform a soft credit check after a period of, for example, four (4) months or four (4) consecutive repayments have been made by the patient.

the payment to provider can be on a non-recourse basis or other terms as mutually agreed upon;

terms of the 'Unified Master Servicing Agreement' can apply as to rules relating to nonpayment, disclosure, follow-up and including other terms as documented in the agreed document;

patients with no credit, irregular income sources or supporting socio-demographic factors;

patients able to obtain financial support as determined by provider;

patient insurance solution as a service provider can act as the servicing agent as needed to ensure that the financial support adheres to standards and regulations currently in place with provider; and terms of the 'Unified Master Servicing Agreement' can apply as to rules relating to nonpayment, disclosure, follow-up and including other terms as documented in the agreed document.

It is noted that the provider retains control over the process, operational outcomes and servicing provided to the patient through a jointly agreed unified master servicing agreement as provided in process 800 (see infra). The unified master servicing agreement is established during implementation and is changed only after mutual agreement between the respective organizations.

Figure 8:
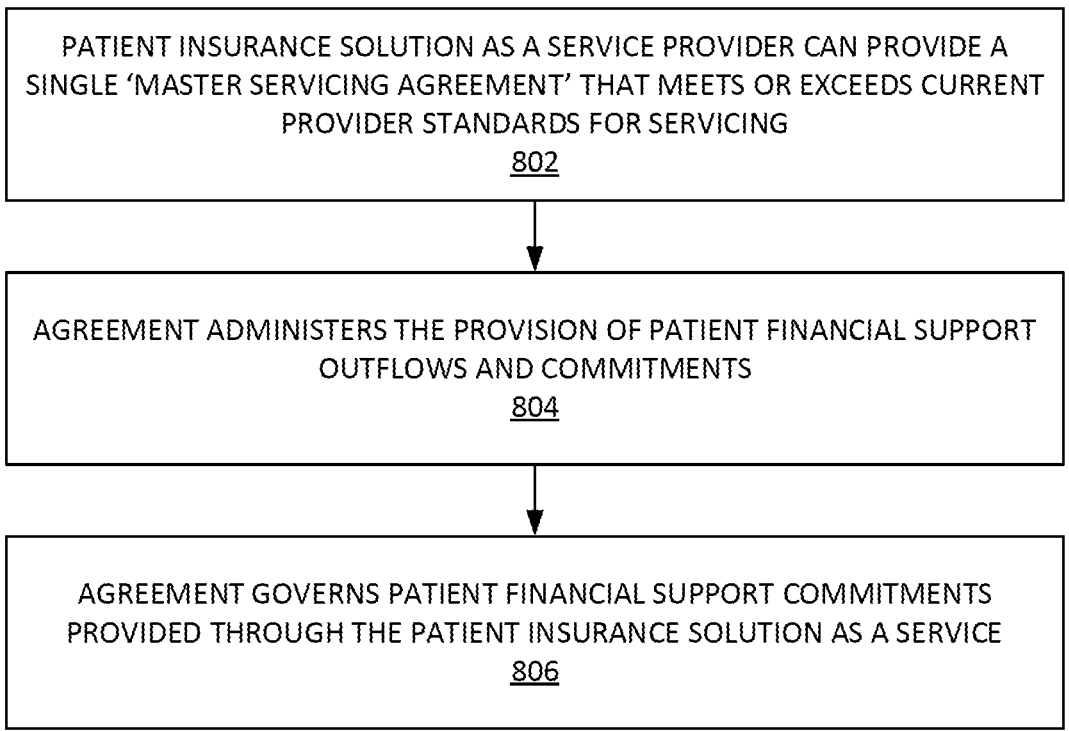
FIG. 8 illustrates an example process for implementing a unified master servicing agreement, according to some embodiments.

FIG. 8 illustrates an example process 800 for implementing a unified master servicing agreement, according to some embodiments. In step 802, the patient insurance solution as a service provider can provide a single 'Master Servicing Agreement' that meets or exceeds current provider standards for servicing. In step 804, the agreement can administer the provision of patient financial support outflows and commitments. This can be to ensure that patients are not unduly burdened by repayment commitments as and when they arise. In step 806, the agreement can govern and apply to patient financial support commitments provided through the patient insurance solution as a service. This can be regardless of the source of origination of funds underlying the support commitment. The patient insurance solution as a service can provide complete transparency as to origination sources. The patient insurance solution as a service can be the Master Service Agent for the financial support provided to patients. In this way, the patient insurance solution as a service can conform and improve upon terms of service currently provided by provider.

Figure 9:
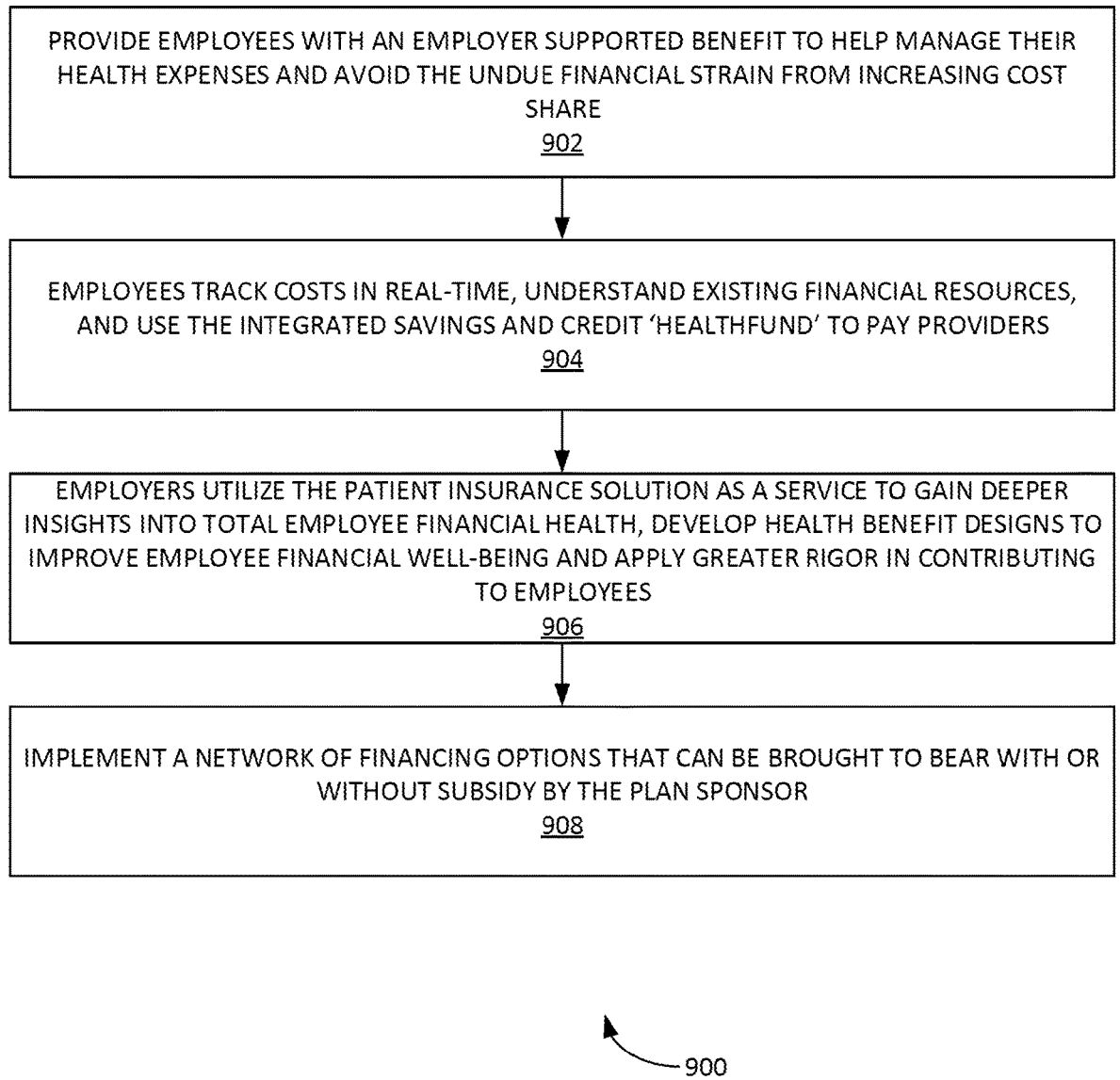
FIG. 9 illustrates an example process for implementing a patient insurance solution as a service, according to some embodiments.

FIG. 9 illustrates an example process 900 for implementing a patient insurance solution as a service, according to some embodiments. In step 902, process 900 provides employees with an employer supported benefit to help manage their health expenses and avoid the undue financial strain from increasing cost share. In step 904, employees track costs in real-time, understand existing financial resources, and use the integrated savings and credit 'healthfund' to pay providers. In step 906, employers utilize the patient insurance solution as a service to gain deeper insights into total employee financial health, develop health benefit designs to improve employee financial well-being and apply greater rigor in contributing to employees. In step 908, process 900 implements a network of financing options that can be brought to bear with or without subsidy by the plan sponsor. Proprietary software uses both population-based, individual financial and other data sets to group populations into cohorts and serve up for each employee/patient their most advantageous set of payment options.

Process 900 can be used to assist healthcare providers to help patients understand, pay or finance their balances after their insurance provider adjudicates their claims. Process 900 can be integrated with existing revenue cycle applications to seamlessly help patients assess their resources, payment options, and use of 'healthfund' to pay their bills.

Additional Embodiments and Processes

Example processes can provide a patient insurance solution as a service. The processes can integrate and verify insurance coverage, deductibles, cost share as needed. Patients can be guided though a simple decision-making process to obtain financial support and/or pay their payment obligations. The patient insurance solution as a service can engage patients with a comprehensive, financial experience that includes visibility into the patient's financial resources, as well giving the patient the ability to finance care without incurring exorbitant interest charges and potential penalties associated with high-cost credit cards. The patient insurance solution as a service can relieve a significant healthcare provider burden by providing patients with a single solution to manage their bills, visibility into estimates and fully-integrated insurance claims from virtually any insurance carrier. The patient insurance solution as a service can deliver a population-based financial health platform assisting the patient and provider throughout the care, financing, and payment lifecycle.

Employees can track healthcare expenses, plan for anticipated expenses, understand existing financial resources, and access the 'healthfund' account to satisfy their healthcare payment obligation. The healthfund provides employees with an additional savings and credit account integrated into employees' payroll and employer's human resources systems. In this way, employees are able to set contribution levels based on healthcare deductibles, income and anticipated spend. The patient-specific financial support as a service can also suggest contribution levels based on individual predictive models of spend, income and credit need for employees. The 'healthfund' provides the employee with an available credit amount during enrollment and updates the employees credit status during the plan year. The savings and credit account work seamlessly with the employee's other financial resources (bank accounts, credit cards, Health Savings Accounts).

The patient-specific financial support as a service can conduct a population assessment that segments employees based on their demographic, social, health and financial status to predict their financial need and total borrowing capacity. The patient-specific financial support as a service can provide the employers with the tools and processes to apply contribution levels for financial support with greater rigor and adapted to individual employee needs and financial resources. The patient-specific financial support as a service can be integrated into the annual enrollment, benefit selection and benefit administration solutions used by employers and employees. Employees engage with a patient-specific financial support as a service system during annual enrollment and are able to identify the available savings and credit available as part of their high deductible plan benefits and cost share. Once the employee health insurance is accessible at the start of the plan year, employees can connect their insurance and financial accounts, review their expenses, understand and estimate costs, and pay providers. The patient-specific financial support as a service can notify employees of their healthfund status, financial resources and costs and alert them to opportunities to build long term health savings.

The patient-specific financial support as a service can be implemented for healthcare organizations. The patient-specific financial support as a service solution for healthcare organizations helps them engage in patient financial screening before providing non-emergency care, accompanied by active financial support to ensure that patients have the financial resources to meet their healthcare payment obligations.

The patient-specific financial support as a service can segment patients based on their demographic, social, health and financial status to predict their financial need. In deploying the patient-specific financial support as a service, healthcare providers can offer patients personalized financial options ranging from point of care payments, lending and other credit solutions—without financial recourse to the healthcare provider. Healthcare providers benefit from collecting accounts that previously might be written off as bad debt, while being able to better manage their community and charitable care commitments both of which are essential for licensing, receiving financial support and maintaining their tax-exempt, not-for-profit status.

The patient-specific financial support as a service can provide personalized patient-focused financial support, financing and management experience which is fully integrated into the healthcare provider's existing patient access infrastructure (e.g. EMR/billing) and the payer's insurance information. The patient-specific financial support as a service can engage patients with a simple, yet comprehensive, financial experience including visibility into all the patient's financial resources, as well giving the patient the ability to finance care without incurring exorbitant interest charges and potential penalties associated with high-cost credit cards. The patient-specific financial support as a service can relieve a significant healthcare provider burden by providing patients with a single solution to manage their bills, visibility into estimates and fully-integrated insurance claims from virtually any insurance carrier. The patient-specific financial support as a service can deliver a population-based financial health platform assisting the patient and provider throughout the care, financing, and payment lifecycle.

Additional Example Methods

Example process can leverage data and analytics to design a set of insurance benefits in the form of discrete services for one or more gig workers/employees. The gig workers/employees can have access to a suite of services that focus on specific benefits and outcomes instead of a class of services currently available through health insurance. The specific suite of services can be based on data and analytics including on-demand funds with a line of credit. In one example, these can be provided through a health savings account, or an employer-funded health reimbursement arrangement account etc. These can also include portable benefits (e.g. specific goods and services to consume). A prediction engine can use public and private data to help an organization (e.g. employer, guild, association, etc.) to design out benefits and how to administer them (e.g. via a copay, no co-pay, pay out of surcharge, etc.). The gig workers/employees can use an application (mobile/web) and a benefit account and payment card that provides ability to consume and pay for services. Payment of services can be through funds provided by the cardholder or funds provided through an organization. The prediction engine can use data to provide specific notifications and engagement of how to obtain maximum benefits, improve outcomes and reduce costs. For example, a specific set of services can be provided to a set of gig workers/employees for a diabetes and medications, etc. Accordingly, the employer can design services for a specific disease like diabetes. Provider has already been included in employer's network, and provide a specific set of services for specific employee insurance needs.

For example, a state's driver's guild can be the gig workers/employees class. Processes provided herein can provide a specific services/goods that this class of users won't have access to via other state-based services or through existing health insurance benefits. These specific services can be related to the continued ability to maintain a level of health and well-being to generate income and the operation of a vehicle (e.g. drug tests, eyeglasses, hearing aids, etc.). Health care resources can be provided that the gig workers/employees would otherwise not have access to because they are not covered or too expensive otherwise. In example, a pre-loaded payment card can provide a pre-determined amount of on-demands funds that can spend on goods and services that can be spent. In one example, the service can be covered and paid from on-demand funds on a principle only basis and/or recover from future earnings from an on-demand standpoint.

Figure 10:
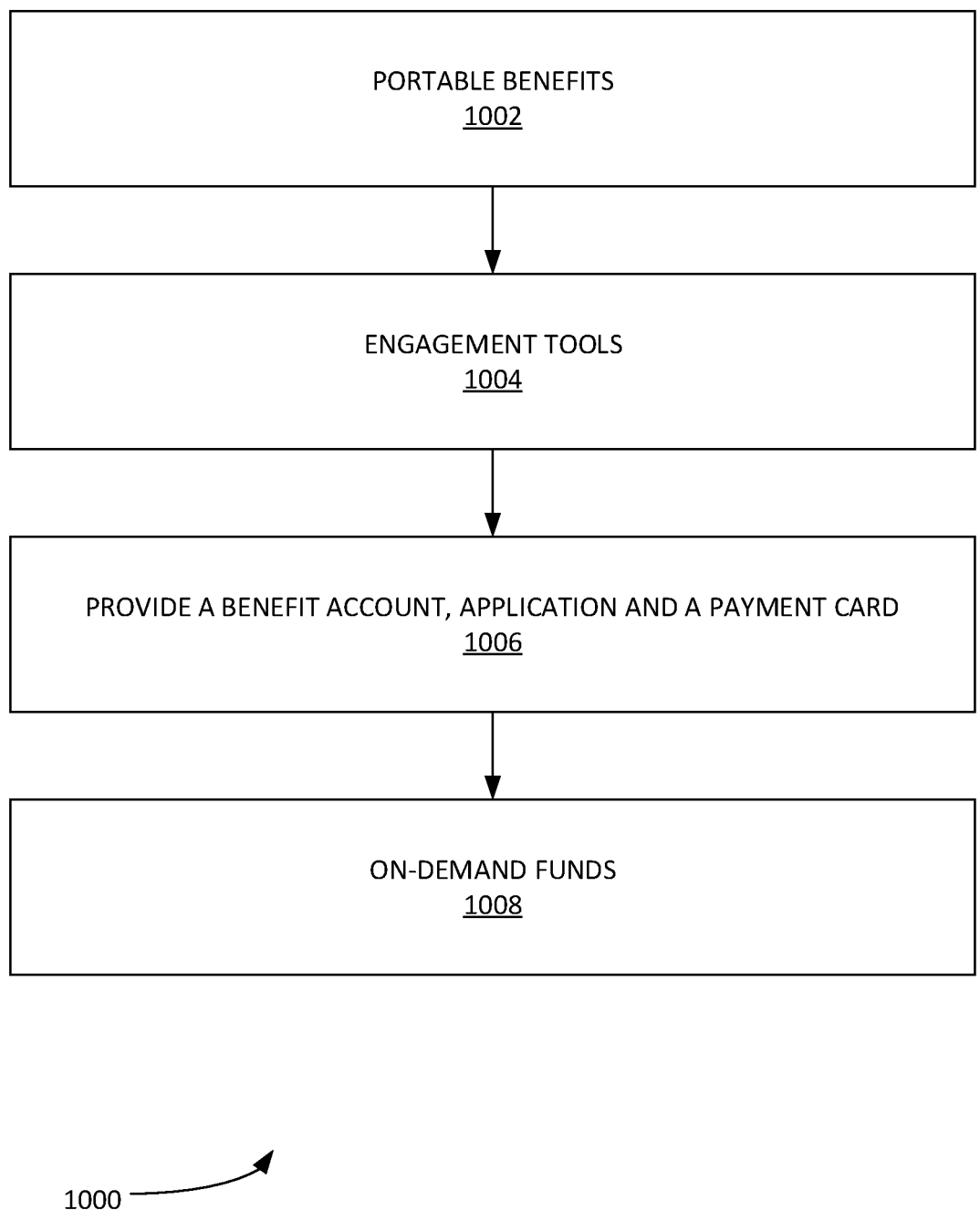
FIG. 10 illustrates an example process for implementing Smart benefit, financial APIs and platform for gig workers, according to some embodiments.

FIG. 10 illustrates an example process 1000 for implementing Smart benefit, financial APIs and platform for gig workers, according to some embodiments. In step 1002, process 1000 can determine a set of portable benefits. This can include determining a predictive population-based benefit design. This can utilize an employer/benefit fund for gig workers/employees. This can be designed to, inter alia: provide reduced costs for chronic conditions management; provide financial protection; provide availability of on-demand funds; and a single solution for HSA and HRA Plans.

In step 1004, process 1000 can determine a set of tools for the gig worker/employee. These can include, inter alia: a point-of-service engagement; incentives for provider access to high performance networks for care; integrated provider discount network (medications, other non-health services); etc.

In step 1006, process 100 can provide a benefit account, application and a payment card. These benefit application, account and card will facilitate personalized financial management, contributions and withdrawals for the account or cardholder. These benefit account can provide apply contributions made to the account as tax-deductible contributions for qualified high-deductible plans (e.g. as a health savings account).

Ins step 1008, process 100 can provide on-demand funds. These can be funded upon card use. The member can pay for services and goods using on-demand funds. There can be repayment from future earnings.

Figure 11:
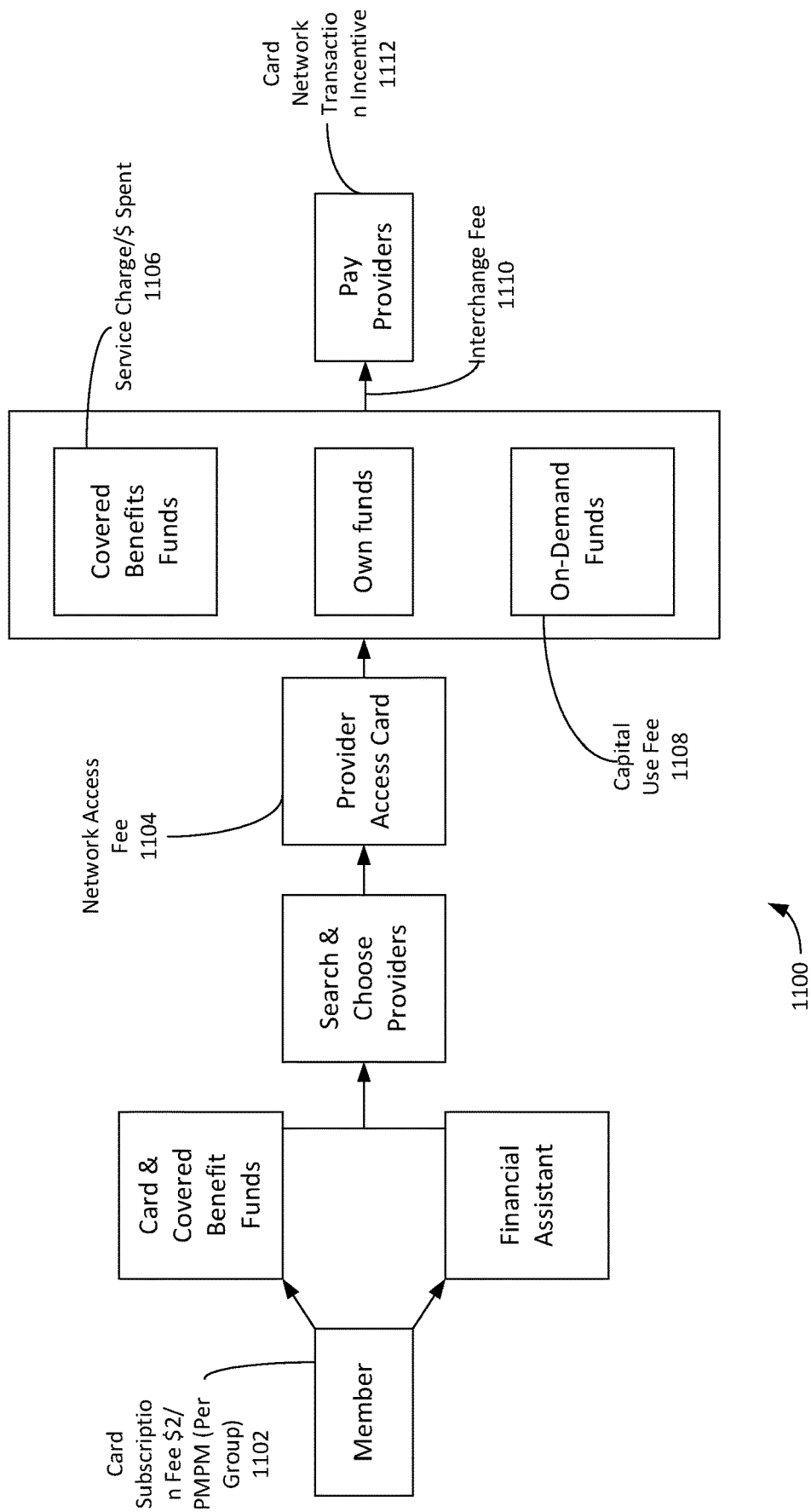
FIG. 11 illustrates an example process for generating revenue in a patient insurance solution as a service for gig employees, according to some embodiments.

FIG. 11 illustrate various example elements of a patient insurance solution as a service for gig employees. In step 1102, process 1100 can charge a card subscription fee (e.g. $/PMPM (Per Member Per Month). In 1104, process 1100 can charge a network access fee (e.g. $/Per Prescription). In step 1106, charge a service charge per dollar spent on goods and services (e.g. %). In step 1108, process 1100 can charge a capital use fee (e.g. $/PMPM (For Cards with an outstanding balance or use of the on-demand funds.)). The fees and charges are provided by way of example.

Figure 12:
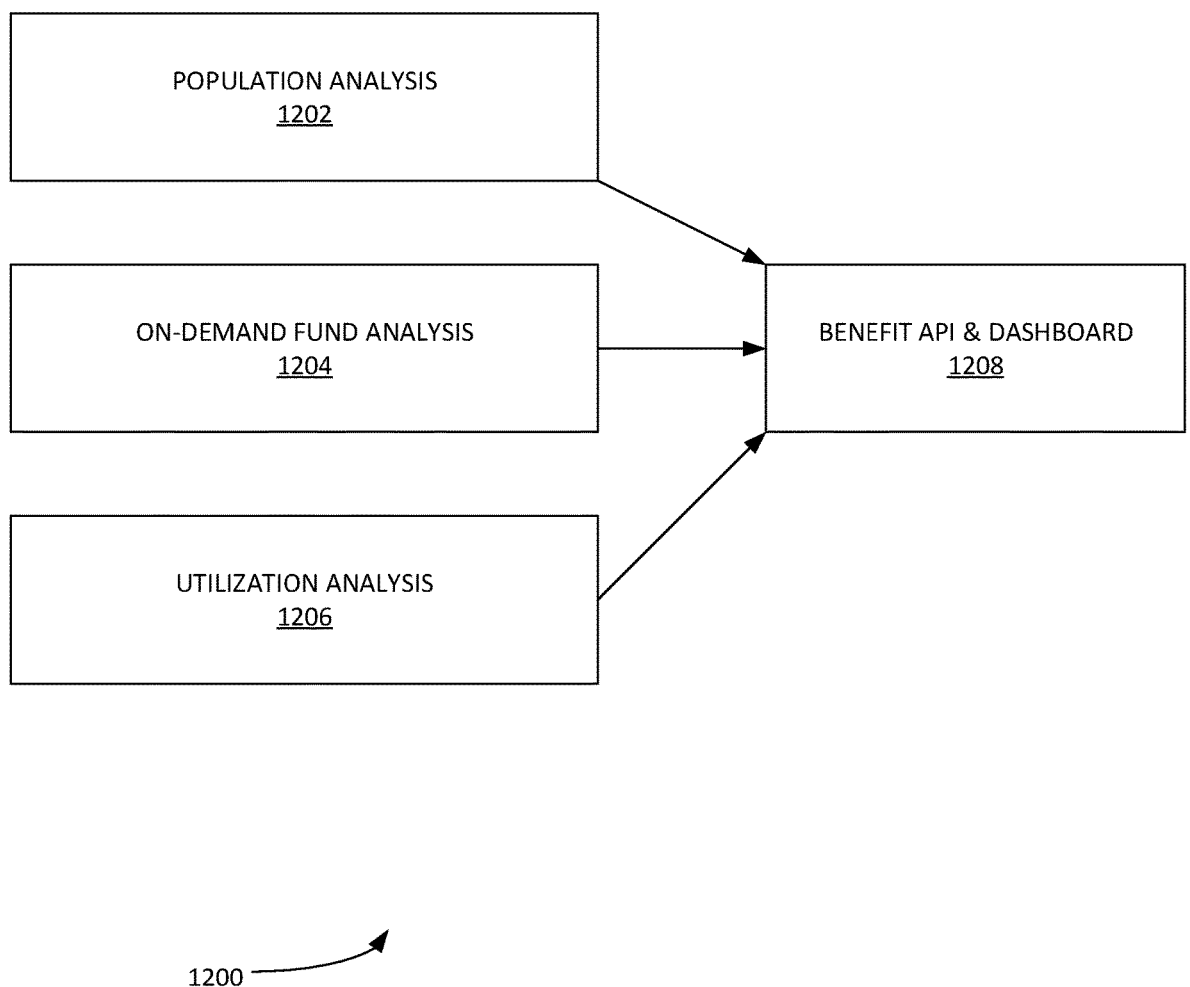
FIG. 12 illustrates an example process for underwriting and predictive analytics engine to design and administer portable benefits, according to some embodiments.

FIG. 12 illustrates an example process 1200 for underwriting and predictive analytics engine to design and administer portable benefits, according to some embodiments. Process 1200 can leverage various machine learning implementation (e.g. see infra). This can be used by the prediction engine. In step 1202, process 1200 can implement population analysis. This can include a data base four-hundred plus unique personas for predicting enrollment in HDHP and HSA. This can be used as training data as well.

In step 1204, process 1200 can implement on-demand fund analysis. This can include wage and value-based predictors of on-demand funds needed for care. Public and private data (e.g. enrollee, health plans data, CMS Data and/or additional employer utilization, etc.) can be leveraged.

In step 1206, a utilization analysis can be implemented. This can include preventive and chronic care-based drivers for value-based incentives using on-demand funds. step 1206 can use census, healthcare exchange enrollment, plan enrollment & risk selection, claims, etc.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

A point of care engagement embodiment is now discussed. It is noted that one of the reasons prior tools for promoting value-based care have had low use and engagement is that they don't engage consumers at the point-of-care. A point of care engagement solution can instantly (e.g. assuming processing and networking latencies, etc.) know when consumers used care as they will use the HSA card for paying for care. The card swipe can activate the app associated with our solution to engage consumers in value-based decisions such as price-shopping for care, reducing primary non-adherence to prescription drugs, using generic drugs and lifestyle change. For example, a card swipe at a cardiologist office, can prompt the app the ask the consumer about follow-up tests and medications. It can then help navigate the consumer to obtain the lowest cost providers of follow-up services by using price-shopping decision tools and incentives. It can also nudge consumers to fill medication prescription and choose generic rather than branded medication. This is also when the consumer will be most receptive to lifestyle changes and the app will engage the consumer in this dimension also.

A Health Savings Account (HSA) with On-demand funds embodiment is now discussed. Each beneficiary receives an HSA with real-time visibility to transaction data and a card for paying health care bills. Each beneficiary also receives access to on-demand funds. On-demand funds are funded instantly upon card use and are repaid within a specified timeframe ((up to twelve (12) monthly installments) from paycheck or gig economy app earnings. The beneficiary only repays the principal and there are no interest payments. Interest costs and default risk are covered through pooled contributions from employer or from workers guild (e.g. for gig economy workers). The On-Demand Funds are structured and designed to separate the principal repayment obligation to the individual gig worker/employee and the interest (cost of capital) burden being met by the employer/association/enterprise supporting the worker. The funds are made available upon use and are not considered loans or credit but in the form of accelerated contribution to the Health Savings Account.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method of training a machine-learning based prediction engine for patient insurance solution as a service for gig employees comprising:

collecting a dataset of Unique Personas for predicting an enrollment in high-deductible health plan (HDHP) and a Health savings account (HSA);

collecting a dataset of an on-demand fund analysis comprising a set of wage and value-based predictors of on-demand funds needed for care;

cleaning the data set of Unique Personas and the dataset of an on-demand fund analysis;

creating a first training set comprising the collected set of the data set of Unique Personas;

creating a second training set comprising the dataset of an on-demand fund analysis; and training the machine-learning based prediction engine in the first stage using the first training set and the second training set;

collecting a data set for utilization analysis comprising a set of preventive and chronic care-based drivers for value-based incentives using on-demand funds;

cleaning the data set for utilization analysis;

creating a third training set comprising the data set for utilization analysis;

training the machine-learning based prediction engine in a first stage using the first training set, the second training set, and third training set;

with the machine-learning based prediction engine generating a financial and healthcare plan design solution for predicting outcomes;

providing a population-based approach patient financials, payments and financing by:

segmenting the set of patients based on a demographic status, a social status, a health status and financial status to predict a financial need and total borrowing capacity of each patient, reviewing of a patient portfolio of a patient and a determining which segment-based patient financial support and shared cost arrangement is appropriate for the patient, and displaying the financial and healthcare plan design solution for predicting outcomes for the patient; and using the financial and healthcare plan design solution for predicting outcomes to offer the patient a personalized point-of-care payments and credit solution without financial recourse to the healthcare provider, wherein the personalized point-of-care payments and credit solution without financial recourse to the healthcare provider comprises a set of tailored patient financial workflows for pre-care financial commitment, approvals and post-care claims adjudication.

2. The computerized method of claim 1, wherein the data set for utilization analysis further comprises a census data set, and a healthcare exchange enrollment data set.

3. The computerized method of claim 2, wherein the data set for utilization analysis further comprises a plan enrollment and risk selection data set and a historical insurance claims data set.

* * * * *